W. Canter.
Chenille Mach.
N° 35,969.      Patented Jul. 22, 1862.
Fig. 1.
Fig. 3.
Fig. 4.     Fig. 5.     Fig. 2.
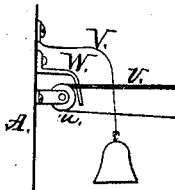
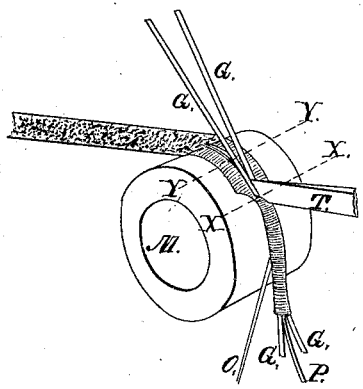
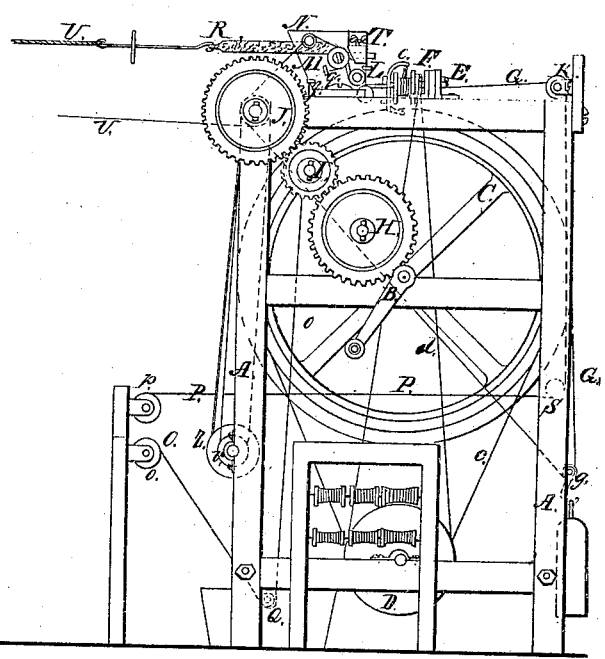
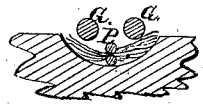
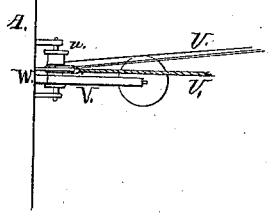
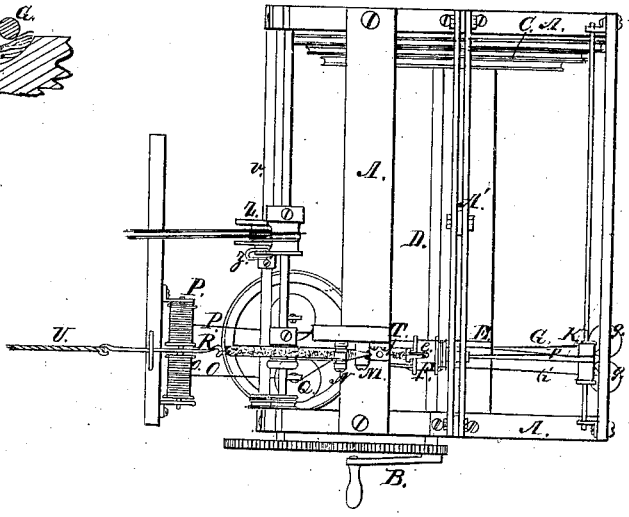
Witnesses:
G. H. Babcock,
Saml Bernstein.
Inventor
Wm. Canter.
N. PETERS, PHOTO-LITHOGRAPHER, WASHINGTON, D.C.

UNITED STATES PATENT OFFICE.

WILLIAM CANTER, OF NEW YORK, N. Y., ASSIGNOR TO SAMUEL BERNSTEIN, OF SAME PLACE.

IMPROVEMENT IN MACHINERY FOR MANUFACTURING CHENILLE.

Specification forming part of Letters Patent No. 35,969, dated July 22, 1862.

*To all whom it may concern:*

Be it known that I, WILLIAM CANTER, of the city, county, and State of New York, have invented a certain new and Improved Machine for the Manufacture of Chenille; and I do hereby declare that the following is a full and exact description of the same, prepared with a view to the obtaining of Letters Patent therefor.

In the use of my machine the stuff does not require to be previously woven in a loom, as in the ordinary method of production; but the silk which is to form the plush surface and the wires or cords which are to retain the same are fed directly from suitable bobbins and retained in position at a single operation. The material produced is not encumbered with any warp-threads or longitudinal threads of any kind other than the two wires or cords which are required to hold the plush when it is finally finished. The cutting off of the material for the plush and its introduction properly between the longitudinal parts is made continuous by the automatic winding of the former around two endless belts which are drawn with proper speed through the winding apparatus and may be operated continuously to any extent desired.

The accompanying drawings form a part of this specification.

Figure 1 is a side elevation, and Fig. 2 a plan view, of my machine. The additional figures represent or illustrate features of the machine on a larger scale, and will be explained below.

Similar letters of reference indicate like parts in all the figures.

A is the framing of the machine.

B is a crank, by turning which motion is imparted to the entire machine.

The wheel C on the same shaft as crank B gives motion, through belt *c*, to the drum D, and this latter, through belt *d*, gives a very rapid rotary motion to a horizontal spindle, E, on which is loosely mounted a bobbin, F, filled with silk. This bobbin is checked by a slight friction in the well-known manner, so that it will not turn with the exact rotation of E, but will turn so as to deliver the silk as it is wanted. The spindle E is hollow throughout its entire length and carries a flier, *e*, on one end, as represented, adapted to draw the silk continuously from the bobbin F and wind it regularly around anything which may be fed through the hollow spindle.

The red line G G represents two continuous belts or endless cords running side by side through the interior of the hollow spindle E. They are kept equally and properly stretched by the two weights and pulleys *g g*. They receive a continuous motion in the direction of the arrow through the action of the gearing H I J, and pass up from the pulleys *g g*, over the pulley K, through the spindle E, under the pulley L, over the pulley M, over the pulley N, and thence down around one of the shafts of the gear-wheels, making one or more coils thereon, so that they shall, by the steady motion of the gearing, be slowly and continuously carried around in the path indicated.

The entire operation of producing the chenille is effected between the point where these two endless cords emerge from the hollow spindle E and the point where they leave the pulley M and pass up over the pulley N; but I employ novel means of imparting a twist to the work, which are highly useful and important, and will be described so soon as I have described the applying of the silk to the chenille cords or wires. I will designate the latter as "wires," presuming the goods desired to be hard chenille; but it must be understood that if soft chenille is wanted the cords therefor are applied in a similar manner as the wires here described. I mount two equal wires, O P, on suitable bobbins, *o p*, as represented, with suitable friction devices to retard the delivery of each, as required. The wire O passes from the bobbin *o* down under a pulley, Q, which is immersed in a suitable gummy or slightly glutinous liquid. This liquid bath is not an essential part of the operation and may be omitted when wires are used; but in the production of soft chenille it conduces sensibly to the perfection and durability of the product. From this pulley Q it passes upward, as represented, and runs through the eyes or guides *q q*, under and around the pulley M, and from thence horizontally away to the hook R. The pulleys L and M are slightly grooved to receive this wire O, which is so guided as to lie on these pulleys directly under other goods or stuff now to be described. The wire P passes from the bobbin p either directly to the pulley K or under a pulley, S, and thence upward over the pulley K, at which latter point it is introduced between the two belts G G, and passes with them through the hollow spindle E. The action of the flier e winds the silk from the bobbin F tightly and evenly around the whole as it emerges from the interior of the spindle E, and the material, as it passes from this point under the pulley L, presents the appearance of simply a smooth gimp or cord, the three longitudinal parts G G and P being covered by the silk wound in continuous spirals around it. In passing upon and partially around the pulley M, the silk covering is presented to and drawn across the edge of a fixed knife, T, which divides it and allows each length, which is equal to once the circumference of the triple cord G G P to extend itself. At this juncture the several lengths are held upon the pulley M by the pressure of the cords or belts G G and the wire P, while the other wire, O, lies in a groove beneath. The wires are thus in their proper position, ready, on being twisted together, to retain the plush properly and uniformly between them. Both the wires P and O pass directly from the pulley M to the hook R, which is continuously revolved and drawn away with a proper force, so that the moment the stuff leaves the pulley M it is by the twisting of the wires P O transformed into chenille. It may be twisted with such tightness by the single operation as to retain the plush with considerable force and make a tolerable article for sale; but I prefer to twist it but slightly at this stage of the operation and afterward to twist it to the full extent desired by other and ordinary twisting means. The endless belts G G pass upward from the pulley M on each side of the fabric and traverse around to serve again, as already described.

Fig. 3 is a perspective view of the pulley M and of the operations which are effected thereon. The belts G G and wire P are represented approaching this pulley in the form of a core wound with silk, while the wire O comes up and underlies it. The knife T cuts the covering, and the material lies for a quarter-revolution of M in a flattened or extended condition, the uniform lengths of plush lying in parallel positions upon the surface of the pulley, with the wire O beneath and the wire P above it. The twisting of the wires so soon as they leave the pulley M relieves the plush from this condition and changes it to a twisted uniform chenille.

Figs. 4 and 5 are cross-sections of the partially-made fabric on a magnified scale. Fig. 4 is a section on the line X X before it reaches the knife T, and Fig. 5 is a section on the line Y Y after the action of the knife has allowed the plush to extend itself. The groove in the pulley M may be in the form here represented, or may be narrower, so as only to receive the wire O, or it may be dispensed with altogether, so long as the several parts are properly guided and applied as indicated.

The means of twisting my chenille which I have invented and which form a part of my machine, are indicated in Figs. 1 and 2. R is a hook, to which the chenille is attached to be twisted and drawn out, and U U are two cords attached to R, and passing on opposite sides of the dividing-post W around the pulley u to the shaft of the gear-wheel J or a small pulley thereon, around which it is coiled one or more times, and is delivered from thence upon a bobbin below. Before commencing the operation the cords U U are extended and tightly twisted together, or so much twisted as it is desired that the chenille shall be twisted when it comes off from the pulley M. Thus prepared the ends of the wires or cords O P are attached to hook R, and the passage of the cords U U past the dividing-post W compels them to untwist and to transfer their twist entirely to the chenille. As the untwisting of U U depends entirely upon the drawing out of the chenille, it follows that the twist is uniformly transferred from one to the other, so that no part of the chenille is twisted more or less than another part.

Instead of storing the cords U U entirely upon the shaft J, they may be passed around such shaft and stored upon a reel or other suitable device elsewhere. I have represented them as stored upon a reel, Z, with a suitable friction-spring, z, on the shaft v below the shaft J, and prefer to so arrange it in practice. The friction-spring z is removed after each operation to allow the ready delivery of the cords U U, to be again twisted by mechanism, (not represented,) and again applied upon twisting the next length of chenille.

The peculiarity of the hollow spindle E, with its flier e, offers some obstructions to the ready exchange of bobbins thereon. I find it most convenient in practice to fill the bobbin F without removing it. I accomplish this very rapidly by simply securing the bobbin F to the spindle E, so that it is compelled to turn therewith, and disconnecting and removing the gear-wheel H from the machine, and unscrewing and disconnecting the flier temporarily from the spindle E. A few revolutions of the crank B and its connections soon fill the spool. It is needless to add that I can apply either a single thread of silk or several at a time, as may be preferred. I have represented six spools as prepared to deliver six threads at once upon F, and of course to wind an equal number at once around the belts G G and wire P.

I have before remarked that the chenille produced by my machine is more uniform than that made by the ordinary means. The reason therefor will be obvious, machine-work generally being superior to hand work in that respect. The lengths of the plush being accurately measured in my work by the winding around the endless cords and being accurately cut by its passage past the sharp edge of T, the chenille is produced in a highly-finished state.

I employ the bell V to indicate when the hook has arrived there. It may be at any distance desired from the other parts of the machine.

Although I have in the above description said nothing of the effect of the gum-water in preserving the twist of the cords O P, it is in practice very appreciable and highly useful. A degree of twist which without this could not be maintained except by the roundabout process of first giving an extra twist to the separate wires or cords in the opposite direction can, by the use of this gum solution applied in this simple manner, be successfully applied and maintained with very little labor. It is of course important that the additional twist, if any, shall be given very soon after the removal of the chenille from the machine, so that the gum shall not in the interim have time to become thoroughly dry.

The best mode of making and mounting the hollow spindle E, I esteem to be to insert in the fixed cross-bar A' a fixed hollow spindle or tube, and to mount the hollow spindle E on the outside thereof. By this means I get a better bearing than otherwise for my spindle, and the plan involves no disadvantages of any magnitude.

It will be observed that as the sizes of the belts G G are uniform, and as they are always applied tightly together, the size of the core formed by their union to be encircled by the silk is uniform, and that consequently the length of the plush produced by the cutting of the silk is uniform and is accurately measured by being wound around the said core.

I make my chenille of cotton, wool, or any material, the yarns of each being wound and cut, as above stated.

Having now fully described my invention, what I claim as new therein, and desire to secure by Letters Patent, is—

1. In machines for producing chenille, cutting the plush of a proper length at a continuous operation after winding it around the two belts G G by carrying it when so wound under or past a cutting-edge acting in the plane between said belts, substantially as herein specified.

2. In such machines, the insertion of one of the wires or cords in the triangular or other suitable space between two endless belts, G G, and the covering material, for the purpose set forth.

3. The use in chenille-machines of the twisted cords U U and dividing-post W, when used to operate in connection with the shaft J or its equivalent on the machine, so as to be moved with a velocity corresponding with the means of delivering the chenille to be twisted, substantially in the manner herein set forth.

In testimony whereof I have hereunto set my name in presence of two subscribing witnesses.

WM. CANTER.

Witnesses:
G. H. BABCOCK,
SAML. BERNSTEIN.